(12) United States Patent
Goldovsky et al.

(10) Patent No.: US 6,539,413 B1
(45) Date of Patent: Mar. 25, 2003

(54) PREFIX TREE ADDER WITH EFFICIENT SUM GENERATION

(75) Inventors: Alexander Goldovsky, Philadelphia, PA (US); Hosahalli R. Srinivas, Irvine, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/525,644

(22) Filed: Mar. 15, 2000

(51) Int. Cl.[7] .................................................. G06F 7/50
(52) U.S. Cl. ....................................... 708/700; 708/710
(58) Field of Search ................................ 708/707, 708, 708/709, 710, 711, 712, 713, 414, 274, 518

(56) References Cited

U.S. PATENT DOCUMENTS

| | | | | | |
|---|---|---|---|---|---|
| 3,814,925 | A | * | 6/1974 | Spannagel | 708/201 |
| 3,987,291 | A | * | 10/1976 | Gooding et al. | 708/711 |
| 4,700,325 | A | * | 10/1987 | Ware | 364/768 |
| 4,737,926 | A | * | 4/1988 | Vo et al. | 708/711 |
| 5,122,982 | A | * | 6/1992 | Cohn | 708/710 |
| 5,166,899 | A | * | 11/1992 | Lamb | 708/713 |
| 5,208,490 | A | * | 5/1993 | Yetter | 708/711 |
| 5,257,218 | A | * | 10/1993 | Poon | 708/274 |
| 5,270,955 | A | * | 12/1993 | Bosshart et al. | 364/736.5 |
| 5,434,810 | A | * | 7/1995 | Goto et al. | 326/114 |
| 5,477,480 | A | * | 12/1995 | Inui | 708/711 |
| 5,479,356 | A | * | 12/1995 | Shackleford et al. | 708/713 |
| 5,500,813 | A | * | 3/1996 | Song et al. | 708/712 |
| 5,508,952 | A | * | 4/1996 | Kantabutra | 708/712 |
| 5,581,497 | A | * | 12/1996 | Kumar | 708/711 |
| 5,636,156 | A | * | 6/1997 | Mikan et al. | 708/712 |
| 5,701,504 | A | * | 12/1997 | Timko | 708/710 |
| 5,719,802 | A | * | 2/1998 | Purcell et al. | 708/518 |
| 5,719,803 | A | * | 2/1998 | Naffziger | 364/787.01 |
| 5,881,274 | A | * | 3/1999 | Ngo et al. | 708/710 |
| 6,175,852 | B1 | * | 1/2001 | Dhong et al. | 708/712 |

OTHER PUBLICATIONS

Akhilesh Tyagi, A Reduced–Area Scheme for Carry–Select Adders, Oct. 1993, IEEE Transaction on Computers, vol. 42 No. 10, p. 1163–1170.*

Arjhan et al., A Novel Scheme for Irregular Parallel–Prefix Adders, 1997, IEEE Transaction on Computers. p. 74–78.*

A. Weinberger and J.L. Smith, "A One–Microsecond Adder Using One–Megacycle Circuitry," IRE Trans. on Electric Computers, pp. 65–73, Jun. 1956.

T.–F. Ngai et al., "Regular, Area–Time Efficient Carry–Lookahead Adders," Journal of Parallel and Distributed Computing, vol. 3, pp. 92–105, 1986.

(List continued on next page.)

*Primary Examiner*—Chuong Dinh Ngo
*Assistant Examiner*—Chat C. Do
(74) *Attorney, Agent, or Firm*—Ryan, Mason & Lewis, LLP

(57) ABSTRACT

An n-bit prefix tree adder includes n prefix trees, each associated with a bit position of the adder and including a number of computation stages. The computation stages for each of the bit positions include a sum computation stage implemented in logic circuitry. For a subset of the bit positions, the corresponding sum computation logic circuitry computes a sum based at least in part on group-generate, group-transmit and intermediate carry signals. Advantageously, the sum computation logic circuitry is configured to exploit differences in delay associated with generation of the group-generate, group-transmit and intermediate carry signals, so as to reduce the total computational delay of the adder. Additional delay reduction may be achieved by configuring the sum computation stages of the adder in accordance with a left-to-right routing of the group-generate and group-transmit signals, such that a most-significant half of a given set of sum bits are generated in the same prefix trees as a least-significant half of the sum bits.

21 Claims, 5 Drawing Sheets

OTHER PUBLICATIONS

P.M. Kogge and H.S. Stone, "A Parallel Algorithm for the Efficient Solution of a General Class of Recurrence Equations," IEEE Trans. on Computers, vol. C–22, No. 8, pp. 786–793, Aug. 1973.

R.P. Brent and H.T. Kung, "A Regular Layout for Parallel Adders," IEEE Trans. on Computers, vol. C–31, No. 3, pp. 260–264, Mar. 1982.

D. Dozza et al., "A 3.5 NS, 64 Bit, Carry–Lookahead Adder," in Proc. Intl. Symp. Circuits and Systems, pp. 297–300, 1996.

J. Silberman et al., "A 1.0 GHz Single–Issue 64b PowerPC Integer Processor," IEEE Intl. Solid–State Circuits Conf., pp. 230–231, Feb. 1998.

W. Liu et al., "A 250–MHz Wave Pipelined Adder in 2–$\mu$m CMOS," IEEE Journal of Solid–State Circuits, vol. 29, No. 9, pp. 1117–1128, Sep. 1994.

A. Beaumont–Smith et al., "A GaAs 32–bit Adder," IEEE Symposium Computer Arithmetic, pp. 10–17, Jul. 1997.

Z. Wang et al., "Fast Adders using Enhanced Multiple–Output Domino Logic," IEEE Journal of Solid–State Circuits, vol. 32, No. 2, pp. 206–214, Feb. 1997.

G. Bewick et al., "Approaching a Nanosecond: A 32 Bit Adder," IEEE International Conference on Computer Design: VLSI in Computers & Processors, pp. 221–226, Oct. 1988.

A. Weinberger, "High–Speed Binary Adder," IBM Technical Disclosure Bulletin, vol. 24, No. 8, pp. 4393–4398, Jan. 1982.

S. Knowles, "A Family of Adders," IEEE Symposium Computer Arithmetic, pp. 30–34, 1999.

A. Goldovsky et al., "A 1.0–nsec 32–bit Prefix Tree Adder in 0.25–$\mu$m Static CMOS," $43^{rd}$ Midwest Symposium on Circuits and Systems, 5 pages, Aug. 1999.

* cited by examiner

PREFIX TREE ADDER WITH EFFICIENT SUM GENERATION

RELATED APPLICATION

The present application is related to U.S. patent application Ser. No. 09/291,677 filed Apr. 14, 1999 in the name of inventors M. Besz et al. and entitled "Prefix Tree Adder with Efficient Carry Generation," which is incorporated by reference herein.

FIELD OF THE INVENTION

The present invention relates generally to electronic circuits and more particularly to adder circuits for use in semiconductor integrated circuits and other electronic devices.

BACKGROUND OF THE INVENTION

As a result of ever-shrinking very large scale integration (VLSI) process geometries, it has become necessary to reexamine the tradeoffs that have been made in the existing design and implementation of computer arithmetic algorithms. Algorithms utilizing the so-called carry lookahead technique, as described in A. Weinberger and J. L. Smith, "A One-Microsecond Adder Using One-Megacycle Circuitry," IRE Trans. on Electronic Computers, pp. 65–73, June 1956, speed up the addition process by unrolling a recursive carry equation. Both transistor count and interconnection complexity have typically limited the maximum unrolling to 4 bits. Larger adders have been built as block carry-lookahead adders, where the lookahead operation occurs within small blocks, as described in T.-F. Ngai et al., "Regular, Area-Time Efficient Carry-Lookahead Adders," Journal of Parallel and Distributed Computing, Vol. 3, pp. 92–105, 1986.

The recursive carry computation can also be reduced to a prefix computation, as described in, e.g., P. M. Kogge and H. S. Stone, "A Parallel Algorithm for the Efficient Solution of a General Class of Recurrence Equations," IEEE Trans. on Computers, Vol. C-22, No.8, pp. 786–793, August 1973. As described in R. P. Brent and H. T. Kung, "A Regular Layout for Parallel Adders," IEEE Trans. on Computers, Vol. C-31, No. 3, pp. 260–264, March 1982, a prefix tree can be used to compute the carry at the most-significant bit position, and an additional tree superimposed on the prefix tree can be used to compute the intermediate carries. Faster computation of all the carries can be achieved by using a separate prefix tree for each bit position, as described in D. Dozza et al., "A 3.5 NS, 64 Bit, Carry-Lookahead Adder," in Proc. Intl. Symp. Circuits and Systems, pp. 297–300, 1996.

A problem associated with the above-noted full prefix tree adders, which are also known as Kogge-Stone adders, is the additional delay introduced as a result of exponentially growing interconnection complexity. Existing architecture tradeoffs have emphasized reduction of interconnection complexity at the expense of higher gate fanouts. Interconnection complexity can also be reduced by using hybrid carry lookahead/carry select architectures which eliminate the need to implement a full prefix tree for each bit position. The use of low resistance and low capacitance materials can reduce the negative effects of architectures that depend on large amounts of interconnect, as described in J. Silberman et al., "A 1.0 GHz Single-Issue 64b PowerPC Integer Processor," IEEE Intl. Solid-State Circuits Conf., pp. 230–231, February 1998. Furthermore, with additional levels of interconnect, the area overhead required to implement such adders is alleviated through the use of extensive "over-the-cell" routing, which removes the routing channels and further minimizes the interconnect capacitance.

The operation of a conventional prefix tree adder will now be described in greater detail. In a general n-bit prefix tree adder, the addition of two numbers A and B, $$A = -a_{n-1}2^{n-1} + \sum_{j=0}^{n-2} a_j 2^j$$

$$B = -b_{n-1}2^{n-1} + \sum_{j=0}^{n-2} b_j 2^j$$

represented in two's complement binary form, can be accomplished by computing:

$$\left. \begin{array}{l} g_j = a_j b_j \\ p_j = a_j \oplus b_j \\ c_j = g_j + p_j c_{j-1} \\ s_j = p_j \oplus c_{j-1} \end{array} \right\} \forall j \; 0 \leq j < n$$

where $c_{-1}$ is the primary carry-input. The signals designated $g_j$, $p_j$ and $c_j$ are referred to herein as generate, propagate and carry signals, respectively. The resulting sum of A and B is $$S = -s_{n-1}2^{n-1} + \sum_{j=0}^{n-2} s_j 2^j.$$

An overflow occurs, and the resulting sum is invalid, if $$c_{n-1} \oplus c_{n-2} = 1.$$

The above-cited Dozza et al. reference defines $(G_j^i, P_j^i) = (g_j, p_j)$, and $$(G_i^j, P_i^j) = (g_j, p_j) o (g_{j-1}, p_{j-1}) o \ldots o (g_i, p_i) \text{ if } j > i,$$

where o is the fundamental carry operator described in the above-cited Brent and Kung reference and defined as $$(g_j, p_j) o (g_i, p_i) = ((g_j + p_j g_i), p_j p_i).$$

The fundamental carry operator o is both associative and idempotent. At each bit position, the carry is given by $$c_j = G_0^j + P_0^j c_{-1}$$

where $c_{-1}$ is the primary carry input. If there is no primary carry input, then $c_j$ is simply $G_0^j$.

An additional speedup in the above-described conventional prefix tree adder can be achieved by using transmit signals $t_j$ instead of propagate signals $p_j$ to compute the carries for each bit position. The final sum computation still requires the propagate signals $p_j$ to be generated from the primary inputs. However, the propagate signal $p_j$ can be computed as $p_j = \bar{g}_j t_j$, in order to reduce the load on the primary inputs and to eliminate the need for an XOR gate for generating the propagate signal $p_j$.

The addition operation in this case is defined as $$\left.\begin{array}{l}g_j = a_j b_j \\ t_j = a_j + b_j \\ p_j = a_j \oplus b_j = \overline{g}_j t_j \\ c_j = g_j + t_j c_{j-1} \\ s_j = p_j \oplus c_{j-1}\end{array}\right\} \forall j\; 0 \leq j < n$$

where $(G_j^j, T_j^j) (g_j, t_j)$, and $(G_j^j, T_j^j) = (g_j, t_j) o (g_{j-1}, t_{j-1}) o \ldots o(g_i, t_i)$ if $j > i$, where o is the fundamental carry operator. The computation of $(G_0^j, T_0^j)\; \forall j$ follows the same methodology as above for $(G_0^j, P_0^j)$. The carry $c_j$ for each bit position is then given by $$c_j = G_0^j + T_0^j c_{-1}$$

where $c_{-1}$ is the primary carry input. If there is no primary carry input, then $c_j$ is simply $G_0^j$.

The $t_j$ signals can be computed faster than the $p_j$ signals since an OR gate is typically faster than an XOR gate. Hence, the carry computation through the prefix trees can start slightly earlier if the transmit signals are used. Since the sum generation step still uses the propagate signals, the load on the transmit signals in this architecture is smaller than the load on the propagate signals in the architecture which uses the $p_j$ signals to compute the carries. However, the load on the input signals is now higher since both transmit and propagate signals need to be generated.

Improved prefix tree adders which provide significant reductions in logic depth, delay and circuit area relative to the above-described conventional prefix tree adders are disclosed in the above-cited U.S. patent application Ser. No. 09/291,677. Although these improved prefix tree adders provide substantial advantages over conventional prefix tree adders, a need nonetheless remains for further improvements, particularly in terms of the computational delay parameter.

SUMMARY OF THE INVENTION

The invention provides an improved prefix tree adder in which a significant delay reduction is achieved by implementing sum computation logic circuitry in a final stage of the adder so as to exploit the differing delays with which group-generate (G), group-transmit (T) and intermediate carries (c) are generated. Previous adder designs have not exploited these final-stage delay differences to reduce the overall computation delay of the adder.

In accordance with one aspect of the present invention, an n-bit prefix tree adder includes n prefix trees, each associated with a bit position of the adder and including a number of computation stages. The computation stages for each of the bit positions include a sum computation stage implemented in logic circuitry. For at least a subset of the bit positions, the corresponding sum computation logic circuitry computes a sum based at least in part on group-generate, group-transmit and intermediate carry signals. Advantageously, the sum computation logic circuitry is configured to exploit differences in delay associated with generation of the group-generate, group-transmit and intermediate carry signals, so as to reduce the total computational delay of the adder.

In accordance with another aspect of the invention, additional delay reduction may be achieved by configuring the sum computation stages of the adder in accordance with a left-to-right routing of most-significant group-generate and group-transmit signals, such that the most-significant half of the sum bits are generated in the same prefix trees in which the least-significant half of the sum bits are generated.

The adder architecture of the present invention provides a reduced computational delay relative to conventional architectures. The techniques of the invention are applicable to a wide variety of prefix tree adders, including both radix-2 adders and non-radix-2 adders. These and other features and advantages of the present invention will become more apparent from the accompanying drawings and the following detailed description.

DETAILED DESCRIPTION OF THE INVENTION

The present invention will be illustrated below in conjunction with exemplary prefix tree adders. It should be understood, however, that the invention is not limited to use with any particular type of adder, but is instead more generally applicable to any carry-lookahead adder in which it is desirable to provide a significant reduction in critical path delay without unduly increasing the cost or complexity of the adder circuit. For example, although illustrated using radix-2 carry-lookahead prefix tree adders, it will be apparent to those skilled in the art that the disclosed techniques are readily applicable to other types of adders, including non-radix-2 adders.

Figure 1:
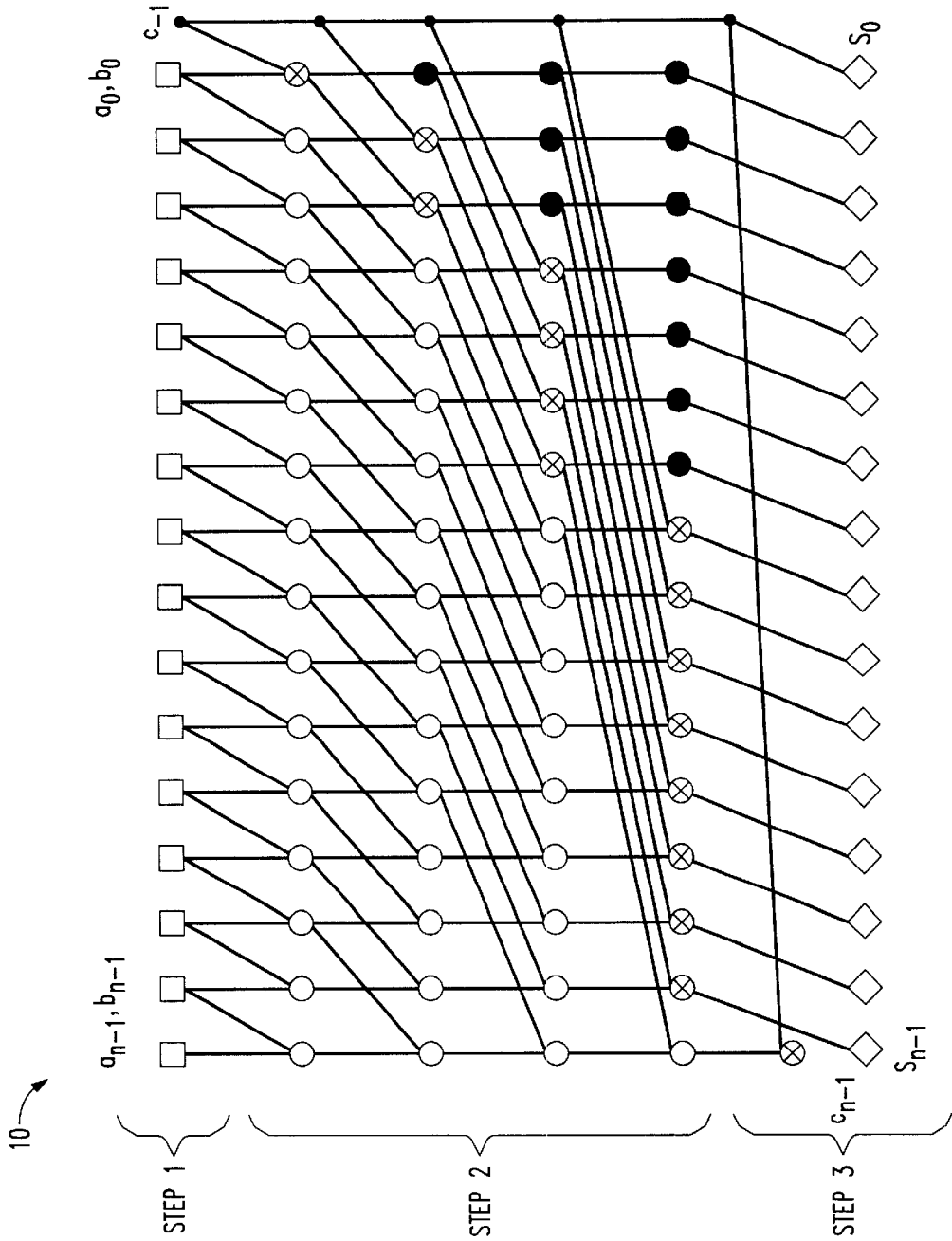
FIG. 1 shows a set of prefix trees for an n-bit prefix tree adder with carry incorporated into the tree as described in the above-cited U.S. patent application Ser. No. 09/291,677.

FIG. 1 shows a set of superimposed prefix trees 10 for an n-bit prefix tree adder of the type described in the above-cited U.S. patent application Ser. No. 09/291,677. The general algorithm for an n-bit radix-2 prefix tree adder of this type is described below.

Step 1 (1 stage):
Calculate $$\left.\begin{array}{l}g_j = a_j b_j \\ t_j = a_j + b_j \\ p_j = a_j \oplus b_j = \overline{g}_j t_j\end{array}\right\} \forall j\; 0 \leq j < n$$

Step 2 ($\lceil \log_2 n \rceil$ stages):
For k=1 ... $\lceil \log_2 n \rceil$ calculate $c_j = G_{j-2^{k-1}+1}^j + T_{j-2^{k-1}+1}^j c_{j-2^{k-1}}\; \forall j\; 2^{k-1}-1 \leq j < 2^{k-1}$, $(G_{j-2^k+1}^j, T_{j-2^k+1}^j) = (G_{j-2^{k-1}+1}^j, T_{j-2^{k-1}+1}^j) o (G_{j-2^k+1}^{j-2^{k-1}}, T_{j-2^k+1}^{j-2^{k-1}})$
$\forall j\; 2^{k-1} \leq j < n$.

Step 3 (1 stage)

Calculate $$s_j = p_j \oplus c_{j-1} \quad \forall j \; 0 \leq j < n,$$

and $$c_{n-1} = G_0^{n-1} + T_0^{n-1} c_{-1}.$$

In the set of prefix trees of FIG. 1, the squares at the top of the figure compute $g_j$, $t_j$ and $p_j$ for each bit position in accordance with Step 1. The empty circles apply the fundamental carry operator in accordance with Step 2. The filled circles represent buffers. The crossed circles compute carries in accordance with Step 2 and Step 3 above. The diamonds at the bottom of the figure generate the sum at each bit position from the $p_j$ signal in accordance with the equation of Step 3. It should be noted that the sum computation of in Step 3 occurs in parallel with the computation of the final carry output $c_{n-1}$ in Step 3.

The logic depth of an n-bit prefix tree adder configured as shown in FIG. 1 is $2+\lceil \log_2 n \rceil$, and the fanout of the carry input $c_{-1}$ is $1+\lceil \log_2 n \rceil$. The above-described algorithm can also be extended in a straightforward manner to higher radix prefix trees.

In order to quantify the computational delay of the FIG. 1 adder for comparison purposes, an exemplary gate level model will be used. This gate level model specifies that a 2-input NAND or NOR gate has a delay of $\delta$, while XOR/XNOR, AOI (and-or-invert), OAI (or-and-invert) and 2-to-1 multiplexer gates each have a delay of $1.5*\delta$. The interconnect delay is modeled as $\delta_v$ for a minimum width routing along the vertical pitch of the corresponding circuit design, and as $\delta_h$ for a minimum width routing along the horizontal pitch of the design. These delays are assumed for a fundamental carry operator fanout of two. Increased fanout of the input carry does not affect the total delay because the carry input is available at the very instant the inputs are applied to the adder, and is used only in the last stage. The contribution of the vertical routing will generally be common across the illustrative adders considered herein and hence may be ignored during comparison. The term $\Delta_r$ will be used in the following description to represent the delay of a given signal r.

The critical path delay for an n-bit adder design (with a total of $(\lceil \log_2 n \rceil + 2)$ logic stages) of the type illustrated in FIG. 1 is as follows:

Stage 1:

$$\Delta_{g_j} = \delta, \; \Delta_{t_j} = \delta, \text{ and } \Delta_{p_j} = 2\delta, \; \forall j \; 0 \leq j < n.$$

Stages 2, . . . , $\lceil \log_2 n \rceil$:

for $k=1, \ldots, \lceil \log_2 n \rceil - 1$, where k is the stage number of the fundamental carry operator in the prefix tree:

$$\Delta_{c_j} = (1.5*k)\delta + (2^k - 1)\delta_h + \Delta_{t_j}, \; \forall \; j2^{k-1} - 1 \leq j < 2^k - 1,$$

$$\Delta_{G^j_{j-2^k+1}} = (1.5*k)\delta + (2^k - 1)\delta_h + \Delta_{t_j} \text{ and}$$

$$\Delta_{T^j_{j-2^k+1}} = (k)\delta + (2^k - 1)\delta_h + \Delta_{t_j}, \; \forall \; j2^{k-1} \leq j < n.$$

Stage $\lceil \log_2 n \rceil + 1$: $k = \lceil \log_2 n \rceil$:

$$\Delta_{c_j} = (1.5*k)\delta + (2^k - 1)\delta_h + \Delta_{t_j}, \; \forall \; j2^{k-1} - 1 \leq j < 2^k - 1,$$

$$\Delta_{G^j_{j-2^k+1}} = (1.5*k)\delta + (2^{k-1} - 1)\delta_h + \Delta_{t_j} \text{ and}$$

$$\Delta_{T^j_{j-2^k+1}} = (k)\delta + (2^{k-1} - 1)\delta_h + \Delta_{t_j}, \; \forall \; j2^{k-1} \leq j < n.$$

Stage $\lceil \log_2 n \rceil + 2$:

$$\Delta_{s_j} = 1.5*\delta + \Delta_{c_{j-1}} + \delta_h, \; \forall j \; 0 \leq j < n,$$

$$\Delta_{c_{n-1}} = 1.5*\delta + \Delta_{G_0^{n-1}} + \delta_h.$$

In the stages 2 to $\lceil \log_2 n \rceil$, the term $\Delta_{t_j}$ is selected to be the worst delay from stage 1 since an OR/NOR gate is typically slower than an AND/NAND gate.

In the $(\lceil \log_2 n \rceil + 2)$-th stage of the adder, the carry signals incur the maximum delay due to the accumulation of the routing delays of the intermediate carry terms, the group-generate signals, and the group-transmit signals that generate the carry terms. This contributes to the term $(2^k - 1)\delta_h$ in the $\Delta_{c_j}$ expression. Since the sum bits depend on the carry signals in the final stage, the total delay in generating the sum bits in an n-bit adder is $\Delta_s = ((1.5*\lceil \log_2 n \rceil) + 2.5)\delta + 2^{\lceil \log_2 n \rceil} * \delta_h$. From simulations it has been determined that bh is approximately related to $\delta$ through $\delta_h = \delta/16$ for an exemplary $0.16\mu$ technology.

Figure 2:
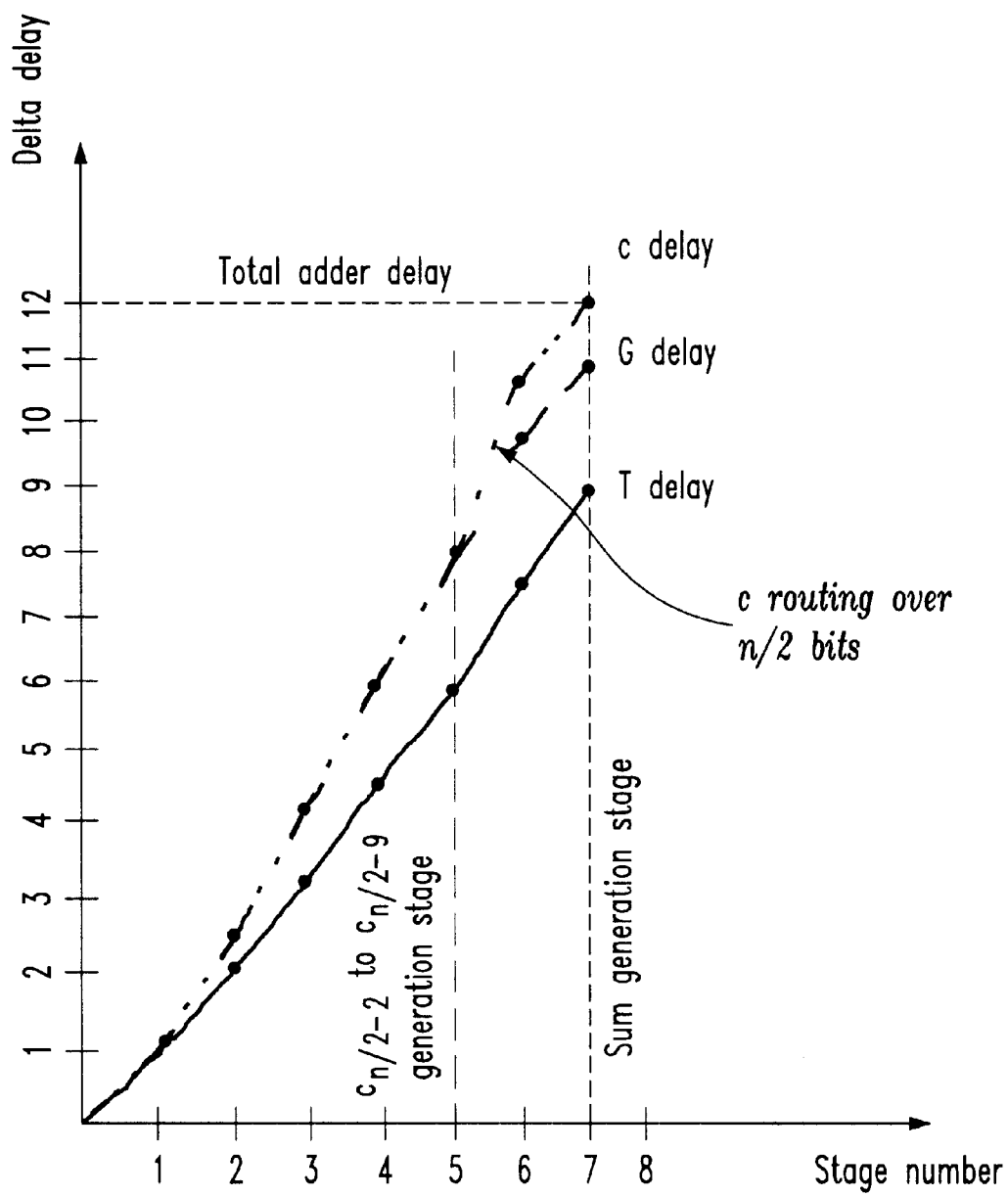
FIG. 2 is a diagram illustrating maximum accumulated stage delays for a 32-bit prefix tree adder of the type illustrated in FIG. 1.

FIG. 2 shows a graph of the maximum accumulated stage delays for group-generate (G), group-transmit (T), and intermediate carries (c) for a 32-bit prefix tree adder design of the type shown in FIG. 1, i.e., an adder design with c routing over n/2 bits. It can be seen from the graph that the group-generate, the group-transmit, and the intermediate carries are all generated with differing delays, and that this difference is maximum at the final stage of the parallel prefix tree of the adder. The total delta delay in this 32-bit prefix tree adder example, in accordance with the expression given above, is $\Delta_s = (1.5*5 + 2.5)\delta + 32*\delta_h = 12.0\delta$, assuming as mentioned previously that $\delta_h = \delta/16$.

The present invention provides an improved prefix tree adder design which significantly reduces delay relative to the FIG. 1 adder design. More particularly, the invention in an illustrative embodiment exploits the above-described difference in the delays for computing the group-generate, group-transmit, and the intermediate carries in the final stage of the prefix tree, by combining the last two stages of the most-significant half of the adder into a single stage. As will be described in greater detail below, this may be done by altering the carry and sum generation equations in the adder algorithm so as to take advantage of the latency of the signals.

Figure 3C:
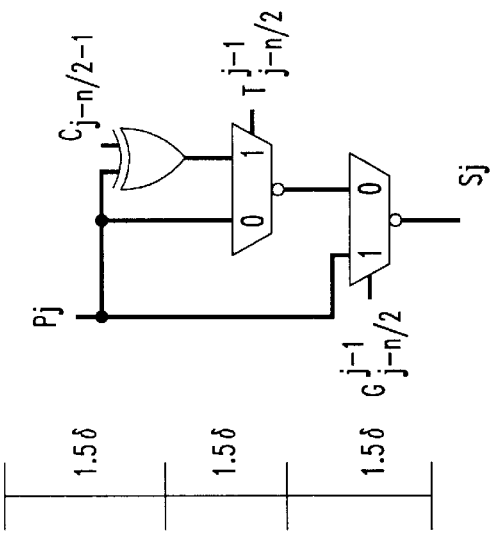
FIGS. 3(b) and 3(c) show logic circuitry used in the last stage of a prefix tree adder for calculating a final sum result, in accordance with an illustrative embodiment of the present invention.
Figure 3B:
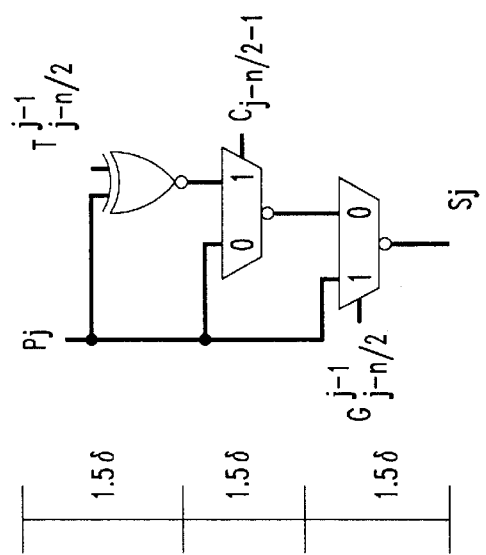
Figure 3A:
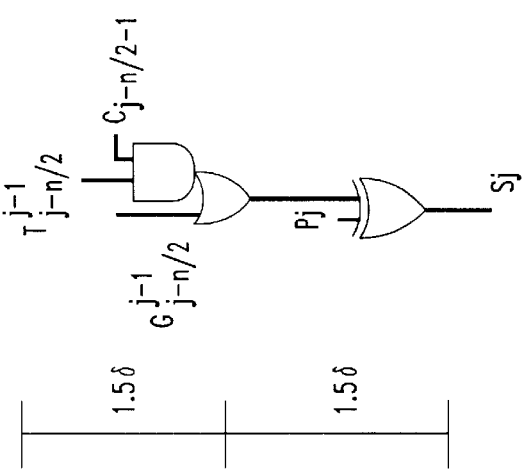
FIG. 3(a) shows logic circuitry used in the last stage of a prefix tree adder of the type illustrated in FIG. 1 for calculating a final sum result.

FIG. 3(a) shows the Boolean logic used in the last stage, i.e., the sum generation stage, of the prefix tree adder of FIG. 1. FIGS. 3(b) and 3(c) show the Boolean logic of two cells which may be used in the most-significant half of the final stage of the adder in order to decrease the adder delay in accordance with the present invention. More specifically, FIG. 3(b) shows the Boolean logic used in the last stage of an improved prefix tree adder in accordance with the invention for all values of j such that $n > j \geq \frac{3}{4}n$, while FIG. 3(c) shows the Boolean logic used in the last stage of the prefix tree adder for all values of j such that $\frac{3}{4}n > j \geq n/2$.

A general algorithm describing the operation of the improved prefix tree adder in greater detail is as follows:

Step 1: (1 stage): calculate:

$$\left.\begin{array}{l} g_j = a_j b_j \\ t_j = a_j + b_j \\ p_j = a_j \oplus b_j = \overline{g}_j t_j \end{array}\right\} \forall j\ 0 \le j < n.$$

Step 2: ($\lceil \log_2 n \rceil - 1$ stages)
for k=1, ..., $\lceil \log_2 n \rceil - 1$, calculate $$c_j = G_{j-2^{k-1}+1}{}^j + T_{j-2^{k-1}+1}{}^j c_{j-2^{k-1}} \ \forall j$$

$$2^k - 1 > j \ge 2^{k-1} - 1, (G_{j-2^{k+1}}{}^j, T_{j-2^{k}+1}{}^j) = (G_{j-2^{k-1}+1}{}^j, T_{j-2^{k}}{}^{j-2^{k-1}+1} + 1^j) o (G_{j-2^{k}+1}{}^{j-2^{k-1}}, T_{j-2^{k}+1}{}^{j-2^{k-1}}) \ \forall j\ n > j \ge 2^{k-1} - 1$$

Step 3: (1 stage) for the final stage, calculate $$s_j = p_j \oplus c_{j-1} \ \forall j\ n/2 > j \ge 0,$$

$$s_j = G_{j-n/2}{}^{j-1} p_j + G_{j-n/2}{}^{j-1}(T_{j-n/2}{}^{j-1}(p_j \oplus c_{j-n/2-1}) + \overline{T}_{j-n/2}{}^{j-1} p_j) \ \forall \ 3/4n > j \ge n/2,$$

$$s_j = G_{j-n/2}{}^{j-1} \overline{P}_j + G_{j-n/2}{}^{j-1}(c_{j-n/2-1}(p_j \oplus T_{j-n/2}{}^{j-1}) + \overline{c}_{j-n/2-1} p_j) \ \forall j\ n > j \ge 3/4n,$$

and $$c_{n-1} = G_0{}^{n-1} + T_0{}^{n-1} c_{-1}.$$

A further improvement in computation speed is possible in accordance with the invention by rearranging the physical layout of the last stage of the adder so that the upper or most-significant half of the sum bits are generated in the same column as the lower or least-significant half of the sum bits. This reduces the routing delay on the intermediate carry signals that are on the critical path and therefore speeds up the sum computation. Such an arrangement may be implemented as a left-to-right routing of the most-significant group-generate and group-transmit signals, and may be referred to as a "folded" arrangement. This further improvement is particularly useful for adders having a large word length, i.e., a word length greater than or equal to 32, and for adder applications in which a regular layout is not required.

Figure 4:
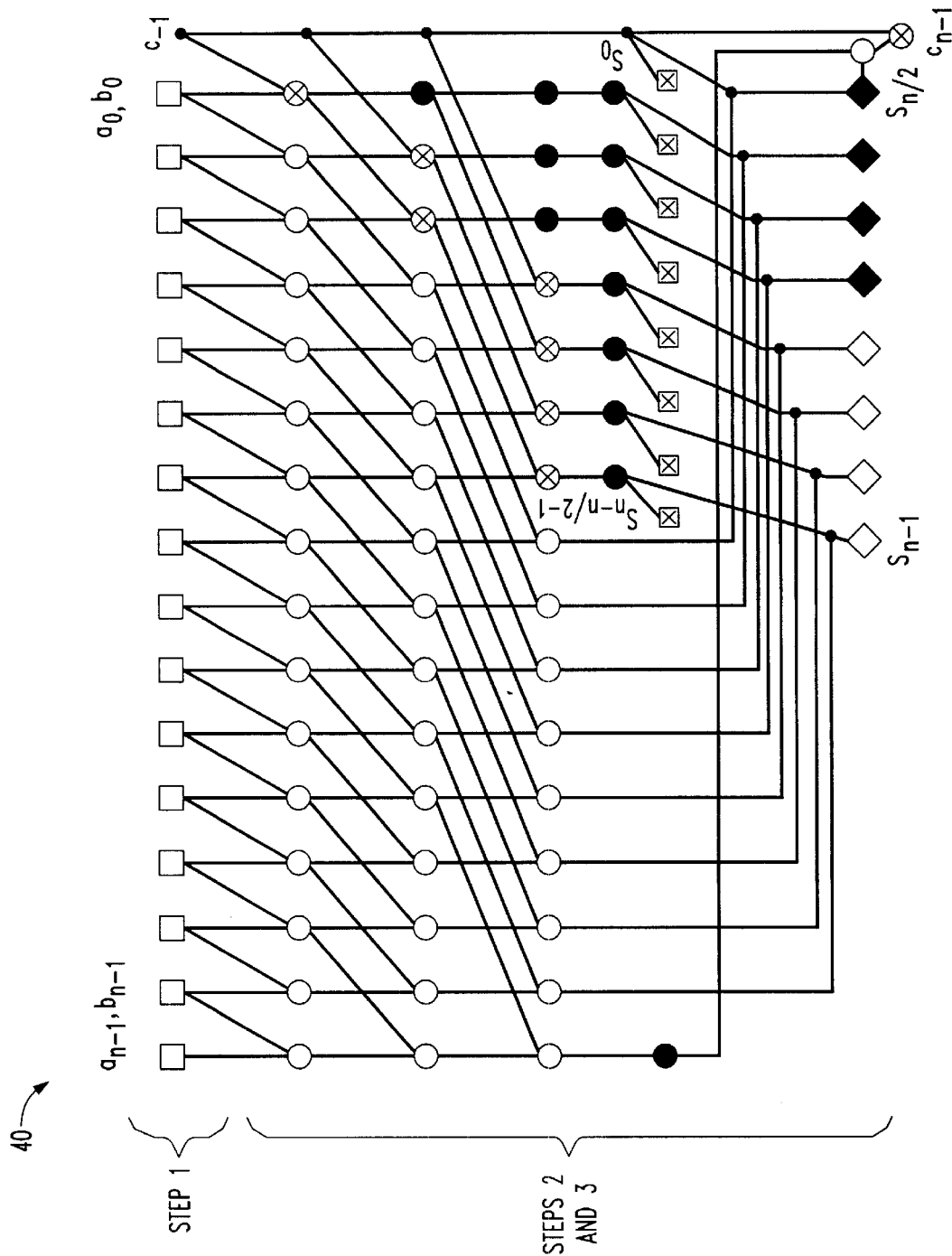
FIG. 4 shows a set of prefix trees for an improved n-bit prefix tree adder in accordance with an illustrative embodiment of the present invention.

FIG. 4 shows a set of superimposed prefix trees 40 for an n-bit prefix tree adder incorporating the above-described improvements. The empty circles apply the fundamental carry operator in accordance with Step 2. The filled circles represent buffers. The crossed circles compute carries in accordance with Step 2 and Step 3 of the general algorithm. The empty diamonds represent the Boolean logic of FIG. 3(b), the filled diamonds represent the Boolean logic of FIG. 3(c), and the crossed rectangles represent logic that implements the sum computation equation in Step 3 for values of j such that $n/2 > j \ge 0$.

It should be emphasized that the logic circuitry in FIGS. 3(a) and 3(b) is shown by way of example only. Those skilled in the art will recognize that numerous alternative arrangements of logic circuitry may be used to exploit the differences in delay in the group-generate, group-transmit and intermediate carry signals in accordance with the techniques of the present invention.

Like the FIG. 1 adder, the improved prefix tree adder of FIG. 4 has a logic depth of $2 + \lceil \log_2 n \rceil$, and the fanout of the carry input $c_{-1}$ is $1 + \lceil \log_2 n \rceil$. In addition, the above-described general algorithm for the improved prefix tree adder can be extended in a straightforward manner to higher radix prefix trees.

Figure 5:
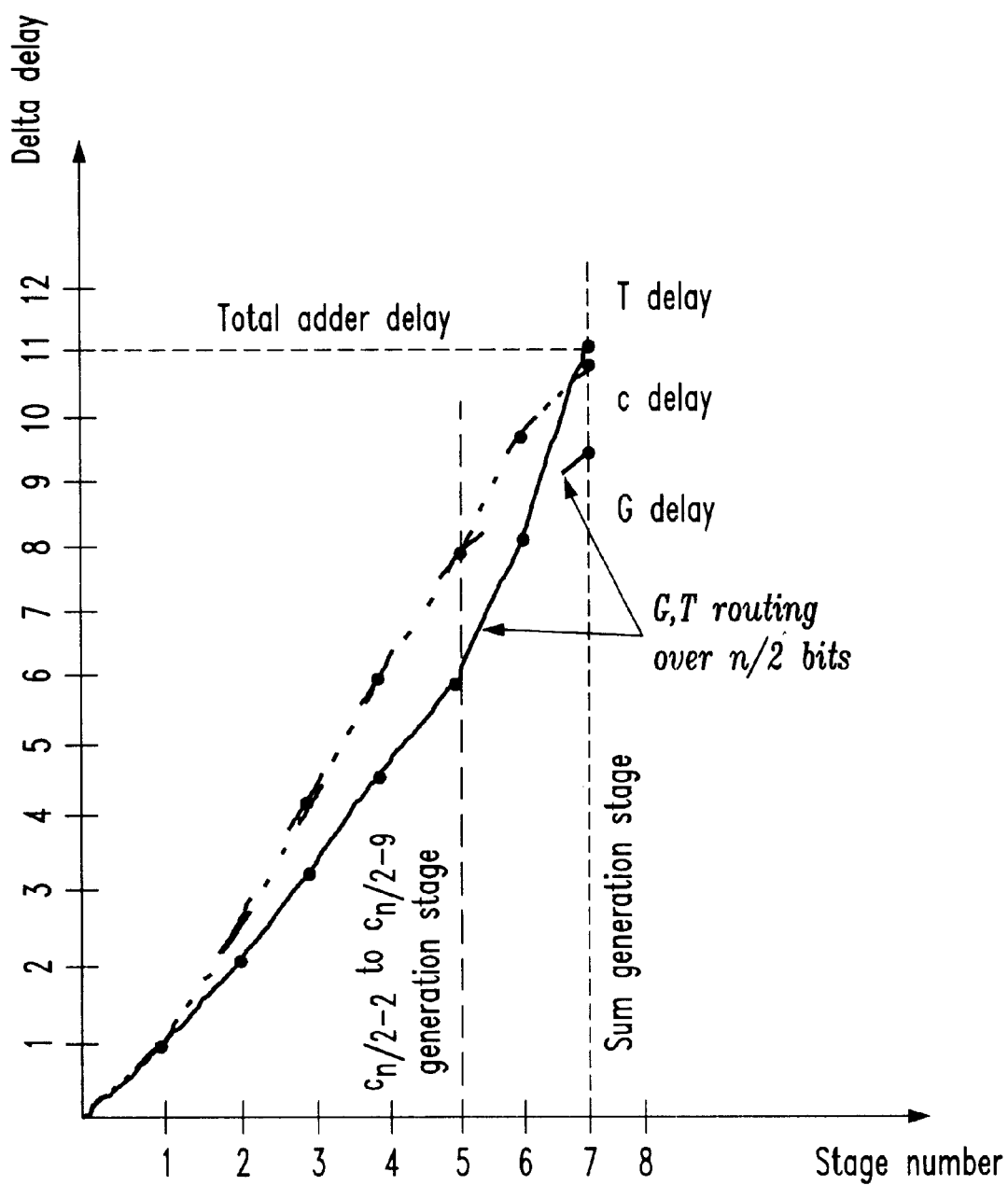
FIG. 5 is a diagram illustrating maximum accumulated stage delays for a 32-bit prefix tree adder of the type illustrated in FIG. 4.

FIG. 5 shows a graph of the maximum accumulated stage delays for group-generate (G), group-transmit (T), and intermediate carries (c) for a 32-bit prefix tree adder design of the type shown in FIG. 4, i.e., an adder design with G and T routing over n/2 bits. It is apparent from the graph that the delay of the improved prefix tree adder is smaller than that of the adder of FIG. 1. More specifically, the total adder delay to produce the sum output is given by:

$$\Delta_{s_j} = \max\left(\Delta_{G_{j-n/2}^{j-1} \cdot to \cdot s_j}, \Delta_{c_{j-n/2-1} \cdot to \cdot s_j}, \Delta_{T_{j-n/2}^{j-1} \cdot to \cdot s_j}\right) \forall \ jn > j \ge \frac{n}{2}$$

$$\Delta_{s_j} = \max((1.5*k)\delta + 2.5*\delta + 2^{k+1}\delta_h, (1.5*k)\delta + 4.0*\delta + (2^k)\delta_h,$$
$$(k)\delta + 5.5*\delta + (2^{k+1})\delta_h),$$

where $k = \lceil \log_2 n \rceil - 1$. For the present example, in which n=32, the above expression yields a total adder delay of $11.5\delta$.

The adder architecture of the present invention thus reduces the gate delay of an n-bit prefix tree adder, as compared to existing architectures such as that illustrated in FIG. 1, while providing the same logic depth, fanout and wiring complexity. For example, a fully-static 32-bit radix-2 prefix tree adder configured in accordance with the invention has a delay on the order of 0.7 nsec in a 0.16 μm static CMOS implementation. The wiring complexity is manageable in 0.16 μm technology using five layers of interconnect.

Although static circuits were used in the above-described illustrative 32-bit implementations, it should be noted that the invention may be implemented using either static circuits, dynamic circuits or combinations of both static and dynamic circuits. Static circuits are often preferred to dynamic circuits because of their ease of design.

The above-described illustrative embodiments of the invention may be configured to meet the requirements of a variety of different circuit applications, using any desired value of n. Adders in accordance with the invention may be used as elements of many different types of circuits, such as, e.g., arithmetic logic units (ALUs), multiply-add units, and comparators. The invention can be incorporated in a wide variety of integrated circuits or other processing devices, including, e.g., microprocessors, digital signal processors (DSPs), microcontrollers, application-specific integrated circuits (ASICs), memory circuits, telecommunications hardware and other types of processing devices. Moreover, as previously noted, a variety of other types of adders, including non-radix-2 adders, may also be implemented using the techniques of the present invention. These and numerous other alternative embodiments may be devised by those skilled in the art without departing from the scope of the following claims.

What is claimed is:

1. An adder comprising:
a plurality of prefix trees, each associated with a bit position of the adder and including one or more computation stages, the computation stages for each of the bit positions including a sum computation stage implemented in logic circuitry, and wherein the logic circuitry of the sum computation stage for at least a subset of the bit positions of the adder computes a sum based at least in part on group-generate, group-transmit, propagate and intermediate carry signals, and is configured to exploit differences in delay associated with generation of the group-generate, group-transmit and intermediate carry signals so as to reduce the total computational delay of the adder.

2. The adder of claim 1 wherein the adder comprises a radix-2 adder.

3. The adder of claim 1 further including a separate prefix tree for each bit position.

4. The adder of claim 1 wherein a carry computed for a lower bit position is used to compute a carry for at least one higher bit position in parallel within the corresponding prefix trees.

5. The adder of claim 1 wherein a generate signal and at least one of a propagate signal and a transmit signal are generated in an initial stage of each of the prefix trees without utilizing a primary carry input signal.

6. The adder of claim 1 wherein an initial stage of each of the prefix trees calculates $$\left. \begin{array}{l} g_j = a_j b_j \\ t_j = a_j + b_j \\ p_j = a_j \oplus b_j = \overline{g}_j t_j \end{array} \right\} \forall j \; 0 \leq j < n,$$

where $g_j$ is a generate signal, $t_j$ is a transmit signal, $p_j$ is a propagate signal, and n is the number of bit positions of the adder.

7. The adder of claim 6 wherein a plurality of subsequent stages of each of the prefix trees each calculate $$c_j = G_{j-2^{k-1}+1}{}^j + T_{j-2^{k-1}+1}{}^j c_{j-2^{k-1}} \; \forall j$$

$$2^k - 1 > j \geq 2^{k-1} - 1,$$

$$(G_{j-2^k+1}{}^j, T_{j-2^k+1}{}^j) = (G_{j-2^{k-1}+1}{}^j, T_{j-2}$$

$$k-1_{+1}{}^j) o (G_{j-2^k+1}{}^{j-2^{k-1}}, T_{j-2^k+1}{}^{j-2^{k-1}})$$

$$\forall j \; n > j \geq 2^{k-1} - 1$$

where G denotes a group-generate signal, T denotes a group-transmit signal, c denotes an intermediate carry signal, and o is a carry operator.

8. The adder of claim 6 wherein the sum computation stage of each of the prefix trees calculates a sum $s_j$ as follows:

$$s_j = p_j \oplus c_{j-1} \; \forall j \; n/2 > j \geq 0,$$

$$s_j = G_{j-n/2}{}^{j-1} p_j + G_{j-n/2}{}^{j-1}(T_{j-n/2}{}^{j-1}(p_j \oplus c_{j-n/2-1}) + \overline{T}_{j-n/2}{}^{j-1} p_j) \; \forall j \; \tfrac{3}{4}n > j \geq n/2,$$

$$s_j = G_{j-n/2}{}^{j-1} \overline{p}_j + G_{j-n/2}{}^{j-1}(c_{j-n/2-1}(p_j \oplus T_{j-n/2}{}^{j-1}) + \overline{c}_{j-n/2-1} p_j) \; \forall j \; n > j \geq \tfrac{3}{4}n.$$

where G denotes a group-generate signal, T denotes a group-transmit signal, and c denotes an intermediate carry signal.

9. The adder of claim 8 wherein an output carry signal $c_{n-1}$ for the prefix tree adder is calculated as:

$$c_{n-1} = G_0{}^{n-1} + T_0{}^{n-1} c_{-1}.$$

10. The adder of claim 1 wherein the sum computation stages of the adder are configured in accordance with a left-to-right routing of the group-generate and group-transmit signals such that a most-significant half of a given set of sum bits are generated in the same prefix trees as a least-significant half of the sum bits.

11. An integrated circuit comprising:
at least one adder, the adder comprising a plurality of prefix trees, each of the prefix trees being associated with a bit position of the adder and including one or more computation stages, the computation stages for each of the bit positions including a sum computation stage implemented in logic circuitry, and wherein the logic circuitry of the sum computation stage for at least a subset of the bit positions of the adder computes a sum based at least in part on group-generate, group-transmit, propagate and intermediate carry signals, and is configured to exploit differences in delay associated with generation of the group-generate, group-transmit and intermediate carry signals so as to reduce the total computational delay of the adder.

12. A method for performing an addition operation, the method comprising the steps of:
providing a plurality of prefix trees in an adder, each prefix tree associated with a bit position of the adder and including one or more computation stages, the computation stages for each of the bit positions including a sum computation stage; and
computing a sum in the sum computation stage for at least a subset of the bit positions of the adder, based at least in part on group-generate, group-transmit, propagate and intermediate carry signals, the computing step being configured to exploit differences in delay associated with generation of the group-generate, group-transmit and intermediate carry signals so as to reduce the total computational delay of the adder.

13. The method of claim 12 wherein the adder comprises a radix-2 adder.

14. The method of claim 12 further including a separate prefix tree for each bit position.

15. The method of claim 12 wherein a carry computed for a lower bit position is used to compute a carry for at least one higher bit position in parallel within the corresponding prefix trees.

16. The method of claim 12 wherein a generate signal and at least one of a propagate signal and a transmit signal are generated in an initial stage of each of the prefix trees without utilizing a primary carry input signal.

17. The method of claim 12 wherein an initial stage of each of the prefix trees calculates $$\left. \begin{array}{l} g_j = a_j b_j \\ t_j = a_j + b_j \\ p_j = a_j \oplus b_j = \overline{g}_j t_j \end{array} \right\} \forall j \; 0 \leq j < n,$$

where $g_j$ is a generate signal, $t_j$ is a transmit signal, $p_j$ is a propagate signal, and n is the number of bit positions of the adder.

18. The method of claim 17 wherein a plurality of subsequent stages of each of the prefix trees each calculate $$c_j = G_{j-2^{k-1}+1}{}^j + T_{j-2^{k-1}+1}{}^j c_{j-2^{k-1}} \; \forall j$$

$$2^k - 1 > j \geq 2^{k-1} - 1,$$

$$(G_{j-2^k+1}{}^j, T_{j-2^k+1}{}^j) = (G_{j-2^{k-1}+1}{}^j, T_{j-2^{k-1}}$$

$$+1^j) o (G_{j-2^k+1}{}^{j-2^{k-1}}, T_{j-2^k+1}{}^{j-2^{k-1}}) \; \forall j \; n > j \geq$$

$$2^{k-1} - 1$$

where G denotes a group-generate signal, T denotes a group-transmit signal, c denotes an intermediate carry signal, and o is a carry operator.

19. The method of claim 17 wherein the sum computation stage of each of the prefix trees calculates a sum $s_j$ as follows:

$s_j = p_j \oplus c_{j-1} \quad \forall j \; n/2 > j \geq 0,$ $s_j = G_{j-n/2}^{j-1} p_j + G_{j-n/2}^{j-1}(T_{j-n/2}^{j-1}(p_j \oplus c_{j-n/2-1}) + \overline{T}_{j-n/2}^{j-1} p_j) \quad \forall j \; \tfrac{3}{4}n > j \geq n/2,$ $s_j = G_{j-n/2}^{j-1} \overline{P}_j + G_{j-n/2}^{j-1}(c_{j-n/2-1}(p_j \oplus T_{j-n/2}^{j-1}) + \overline{c}_{j-n/2-1} p_j) \quad \forall j \; n > j \geq \tfrac{3}{4}n,$ where G denotes a group-generate signal, T denotes a group-transmit signal, and c denotes an intermediate carry signal.

20. The method of claim 19 wherein an output carry signal $c_{n-1}$ or the adder is calculated as:

$$c_{n-1} = G_0^{n-1} + T_0^{n-1} c_{-1}.$$

21. The method of claim 12 wherein the sum computation stages of the adder are configured in accordance with a left-to-right routing of the group-generate and group-transmit signals such that a most-significant half of a given set of sum bits are generated in the same prefix trees as a least-significant half of the sum bits.

* * * * *